United States Patent [19]
Schwaller et al.

[11] Patent Number: 6,134,229
[45] Date of Patent: Oct. 17, 2000

[54] MULTICHANNEL BROADBAND TRANSCEIVER SYSTEM MAKING USE OF A DISTRIBUTED CONTROL ARCHITECTURE FOR DIGITAL SIGNAL PROCESSOR ARRAY

[75] Inventors: John Schwaller, Palm Bay; Thomas Schmutz, Melbourne; Allen G. Plum, Palm Bay; David D. Coons, Satellite Beach, all of Fla.

[73] Assignee: Airnet Communications Corporation, Melbourne, Fla.

[21] Appl. No.: 08/932,793

[22] Filed: Sep. 5, 1997

Related U.S. Application Data

[63] Continuation of application No. 08/568,877, Dec. 11, 1995, abandoned.

[51] Int. Cl.[7] .................................................. H04J 3/00
[52] U.S. Cl. ............................................. 370/336; 370/345
[58] Field of Search ..................................... 370/315, 321, 370/328, 329, 330, 336, 337, 347, 348, 349, 355, 357, 360, 384, 484, 489, 496; 375/219, 220, 316; 455/507, 73, 77

[56] References Cited

U.S. PATENT DOCUMENTS

| | | | |
|---|---|---|---|
| 5,251,232 | 10/1993 | Nonami | 375/216 |
| 5,305,467 | 4/1994 | Herndon et al. | 455/56.1 |
| 5,497,373 | 3/1996 | Hulen et al. | 370/79 |
| 5,535,240 | 7/1996 | Carney et al. | 375/219 |
| 5,539,730 | 7/1996 | Dent | 370/29 |

FOREIGN PATENT DOCUMENTS

95/33350   12/1995   WIPO .

OTHER PUBLICATIONS

Baines R: "The DSP Bottleneck," IEEE Communications Magazine, vol. 33, No. 5, New York, US, pp. 46–54, May 1995.

Patent Abstracts of Japan vol. 017, No. 039 (E–1311), Jan. 25, 1993 & JP 04 256294 A (Toshiba Corp), Sep. 10, 1992, see abstract.

*Primary Examiner*—Chi H. Pham
*Assistant Examiner*—Kwang B. Yao
*Attorney, Agent, or Firm*—Quarles & Brady LLP

[57] ABSTRACT

A control message communication mechanism for use in a broadband transceiver system that includes multiple digital signal processors for performing real time signal processing tasks. One of the digital signal processor (DSPs) is designated as a master DSP. The remainder of the DSPs are arranged in rows and columns to provide a two-dimensional array. A pair of bit-serial interfaces on each DSP are connected in a vertical bus and horizontal loop arrangement. The vertical bus arrangement provides a primary mechanism for the master DSP to communicate control messages to the array DSPs. The horizontal loop mechanism provides a secondary way for DSPs to communicate control information with one another, without involving the master DSP, such as may be required to handle a particular call, without interrupting the more time critical primary connectivity mechanism.

10 Claims, 2 Drawing Sheets

MULTICHANNEL BROADBAND TRANSCEIVER SYSTEM MAKING USE OF A DISTRIBUTED CONTROL ARCHITECTURE FOR DIGITAL SIGNAL PROCESSOR ARRAY

RELATED APPLICATION

This application is a continuation of co-pending application Ser. No. 08/568,877 filed on Dec. 11, 1995 now abandoned, which is incorporated herein by reference in its entirety.

FIELD OF THE INVENTION

This invention relates generally to wireless communication systems, and in particular to a base station making use of a broadband transceiver system having incorporated therein an array of digital signal processors to perform base band signal processing.

BACKGROUND OF THE INVENTION

The base stations used by the providers of current day multiple channel wireless communication services, such as cellular mobile telephone and Personal Communication Systems (PCS), typically designate equipment for each single radio channel. This is probably a result of the fact that each base station is configured to provide communication capability for only a limited predetermined number of channels in the overall frequency spectrum that is available to the service provider. For example, a base station may service a pre-selected number of channels, such as 48, of the total number of the channels available to the service provider using multiple sets of receiver and transmitter signal processing components.

However, certain wireless service providers would prefer to employ equipment that would be more flexible, both in terms of where it can be located, as well as in the extent of the available bandwidth coverage provided by a particular transceiver site. This is particularly true in rural areas where cellular coverage may be concentrated along a highway, and for which the limited capacity of a conventional 48 channel transceiver may be inadequate. This may also be true in other instances, where relatively large, secure, and protective structures for multiple racks of equipment are not necessarily available or cost effective, such as for PCS applications.

One way to resolve this difficulty is to implement the base station with a broadband transceiver system making use of a high speed analog-to-digital (A/D) converter and efficient digital filtering algorithms such as the Fast Fourier Transform (FFT) to separate the incoming signal energy into the desired channels. A bit parallel Time Division Multiple (TDM) bus is then used to distribute samples generated by the channelizer to a set of Digital Signal Processors (DSPs), with these typically being one DSP associated with each receive channel. DSPs which demodulate the channel signals to provide voice signals. On the transmit side, this implementation includes an inverse FFT based combiner which receives modulated base band samples from the TDM parallel bus and outputs a combined signal representative of the contents of the communication channel signals processed thereby. For a more detailed description of such a system, please refer to co-pending United States patent application entitled "Wideband Wireless Base station Making Use of Time Division Multiple Access Bus to Effect Switchable Connections to Modulator/Demodulator Resources", Ser. No. 08/251,914, filed Jun. 1, 1994 and which is assigned to AirNet Communications Corp., the assignee of this application.

This broadband transceiver system is thus capable of processing many of the available channels in parallel rather than only a small subset of the available channels. However, certain difficulties exist with such an architecture. In particular, it requires a significant amount of data samples to be processed by the DSPs in real time. There must therefore be an efficient mechanism to route control information among the DSPs to handle events such as handing off the connection from one cell site to another, routing calls to the correct mobile telephone, and correct billing of usage charges. These and other call processing events must be handled in real time so that the cellular telephone user does not perceive any delays in the audio signal.

In addition, because this broadband transceiver system architecture is digital, it is capable of handling different radio protocols at the same time. Specifically, the digital channelizer and combiner can be programmed to handle different protocols for different active channels. Certain protocols may even require coordination between more than one DSP to handle a single channel, such as may be the case for Global System for Mobile Communications (GSM), Time Division Multiple Access (TDMA) and other digital protocols which provide more than one voice channel for each radio channel. Both of these criteria require official communication of control messages only between certain DSP's in the array. These events must also occur in real time so as not to adversely affect the available processing bandwidth of each DSP.

It would also be advantageous to have a graceful degradation capability in such a system whereby if one or more of the DSPs are unavailable, the ability of the base station to handle calls is not adversely affected.

DESCRIPTION OF THE INVENTION

Summary of the Invention

The invention is used in a broadband transceiver system for a wireless communication system that includes a channelizer and combiner that process digital samples of a number of communications channels in parallel. In the receive direction, data samples from multiple radio channels as provided by the channelizer are fed to a time division multiplex (TDM) bus arrangement which in turn feeds the data samples to a group of digital signal processors (DSPs). Similarly, in the transmit direction, data samples are collected from the group of DSPs and fed to the digital combiner.

The specific advance over the prior art is a technique for interprocessor communication of control messages in the group of DSPs. In particular, one of the DSPs is designated as a master DSP. The remainder of the DSPs are arranged in rows and columns as a two-dimensional array. A first bit-serial interface on each DSP is connected to a serial Time Division Multiplex (TDM) bus to provide interconnection of the DSPs in a given vertical column of the array. The DSPs along a given horizontal row are also connected to one another over a second bit-serial interface.

In operation, call processing control messages originating from a central base station controller are first routed to the master DSP. An arbitration logic circuit routes the control message to the DSP located at the top of the column which contains the DSP which is the intended recipient. The top of column DSP then routes the message down the vertical column via the serial TDM bus to the appropriate DSP.

The serial TDM bus is preferably a synchronous bus having a time slot allocated for each DSP in the column. In this manner, it can be assured that control messages are received reliably, with a maximum latency being dictated by the number of DSPs in each column.

If more than one DSP is needed to handle a given active call, then DSPs in the same row are assigned as a group to handle the call. The second, horizontal serial bus loop facility is then invoked to coordinate inter-DSP communication for the call.

The master DSP may use this messaging scheme to allocate tasks among the DSPs as calls originate. The DSP array architecture thus also permits an arrangement whereby no DSP needs to have a pre-assigned function. Call handling assignments may thus typically last only for the duration of a given call and are then released.

To accomplish this, the master DSP may monitor control radio channels for requests to initiate a mobile telephone call. Once such a request is received, the master DSP sends a request to a network interface processor, such as a base station controller. The base station controller then verifies that the mobile telephone is authorized to request services and makes the necessary network connection to route the call to the connecting mobile telephone switching office. The base station controller then returns a message to the master DSP that the call has been set up on the network side.

The master DSP in turn identifies the next available DSP (or set of DSPs in the same row) as required. It then sends a message using the vertical TDM serial bus indicating that the DSP has been allocated to handle a call. If more than one DSP in the array is to be involved in the call, the other DSPs can be informed, for example by using the horizontal serial bus interconnection.

BRIEF DESCRIPTION OF THE DRAWINGS

For a more complete understanding of the invention and its novel advantages and features, reference should be made to the accompanying drawings in which.

DETAILED DESCRIPTION OF A PREFERRED EMBODIMENT

Figure 1:
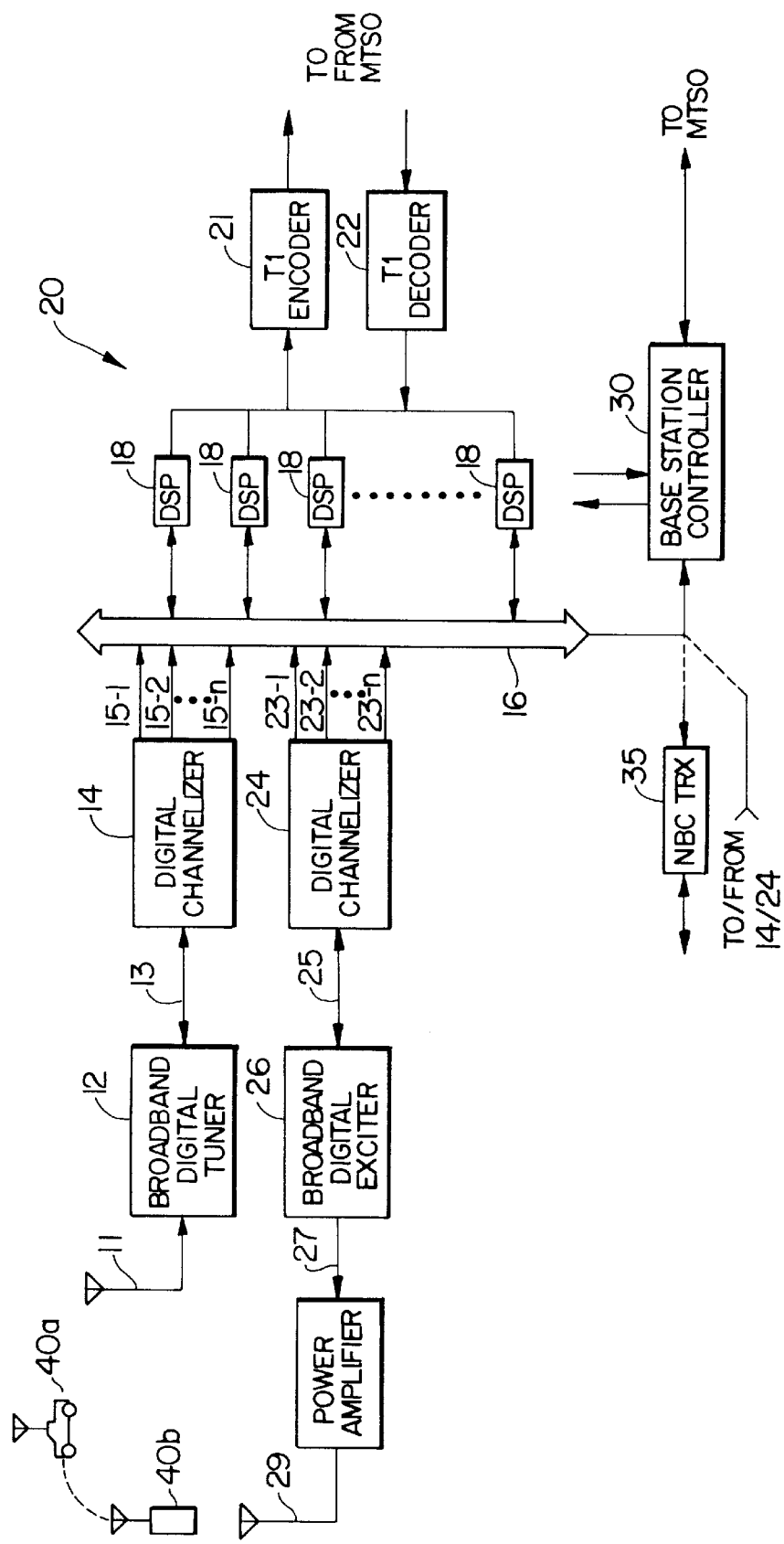
FIG. 1 is a block diagram of a broadband transceiver system in which the invention is used; and, FIG. 2 is a detailed block diagram of the control message mechanism used in the DSP array, illustrating the interconnections used to provide the primary serial TDM bus and secondary serial loop interconnections.

Turning attention now to the drawings, FIG. 1 shows a block diagram of a wireless communication system base station 10 making use of a broadband transceiver system that includes multiple digital signal processors (DSPs) to perform base band operations such as modulation or demodulation. The present invention lies in the specific manner in which the DSPs communicate with one another, specifically, via the interprocessor communication mechanism 20. However, in order to appreciate the novel features and advantages of the invention, other elements of the base station 10 should be understood.

The base station 10 consists of a receive antenna 1, one or more broadband digital tuners 12, one or more digital channelizers 14, a bit-parallel TDM sample bus 16, a plurality of digital signal processors (DSPs) 18 programmed to operate as demodulators and modulators, the interprocessor communication mechanism 20, a transport signal (T-1) encoder 21, a T-1 decoder 22, one or more digital combiners 24, one or more broadband digital exciters 26, a power amplifier 28, a transmit antenna 29, a base station control processor (controller) 30, and a synchronization clock generator 32.

As in the prior art, the base station 10 exchanges radio frequency (RF) signals with a number of mobile subscriber terminals (mobiles) 40a, 40b. The RF signals consist of carrier signals modulated with voice and/or data (channel) signals which are to be coupled to the public switched telephone network (PSTN). The particular modulation in use may be specified by any one of a number of different wireless (air interface) standards such as the well known Advanced Mobile Phone Service (AMPS), time division multiple access (TDMA) such as IS-54B, code division multiple access (CDMA) such as IS-95, frequency hopping standards such as the Global System for Mobile Telecommunications (GSM), personal communication system (PCS) standards, or more use than one such protocol at a given time.

On the receive side (that is, with respect to the base station 10), the RF signals are first received at the receive antenna 11 and then forwarded to the digital tuner 12. The digital tuner 12 downconverts the RF signal to a intermediate frequency (IF) and then performs an analog to digital (A/D) conversion to produce a digital composite signal 13.

The digital channelizer 14 implements a filter bank to separate the composite digital signal 13 into a plurality, N, of individual digital channel signals 15-1, 15-2, . . . , 15-n (collectively, 15). The digital channelizer 14 may implement the filter bank using any of several methods, and no particular digital filter structure is critical to the operation of the invention. However, our co-pending United States patent application entitled "Transceiver Apparatus Employing Wideband FFT Channelizer with Output Sample Timing Adjustment and Inverse FFT Combiner for a Multichannel Communication Network" filed Apr. 8, 1994 and which is assigned to AirNet Communications Corp., the assignee of this application, describes several particular embodiments of the digital channelizer 14 in detail.

The samples which comprise the N digital channel signals 15 are then provided over the time division multiplex (TDM) bit-parallel bus 16 to the plurality of digital signal processors (DSPs) 18. A subset of the DSPs 18 are programmed to remove the modulation on the channel signals 15 as specified by the air interface standard.

Depending upon the air interfaces in use, there may not be a one-to-one correspondence between the number of DSPs 18 and the number of channel signals, N. For example, because of the heavy required signal processing, it may be necessary for more than one DSP 18 to process a given channel signal 15.

The signal outputs of the DSPs 18, representing demodulated audio or data signals, are then forwarded over the communication mechanism 20 to the encoder 21. The encoder 21, in turn reformats the demodulated signals as necessary for transmission over a land based telephone returning such as to a Mobile Telephone Switching Office (MTSO). The demodulated signals may be formatted according to any one of a number of well-known time multiplex telephone signal transport protocols, such as the so-called T1 span (or E1). The MTSO complete the call from the subscriber unit 40 to another telephone subscriber in a known fashion.

The signal flow on the transmit side of the base station 10 is analogous. Audio or data signals received from the MTSO are provided to the T1 decoder 22. The decoded signals are then coupled to the DSPs 18 over the communication mechanism 20. A subset of the DSPs 18 then modulate these signals and presents them to the TDM parallel bus 16 which in turn couples them to one of the N input digital channel signals 23-1, 23-2, ..., 23-n of the combiner 24. The digital combiner 24 then combines the TDM bus outputs to produce a composite IF digital signal 25 representing the N channels to be transmitted. The digital combiner 24 then feeds this combined signal to the digital exciter 26, which generates an RF signal 27 suitable for amplification by the power amplifier 28 which in turn feeds the transmit antenna 29.

Other DSPs 18 are typically unused at any particular point in time, and these remain an available resource to the base station 10. The manner in which unused DSPs are allocated at the time of setting up a call will be described in detail below in connection with FIG. 2.

In order to set up each call, the base station controller 30 must exchange certain control information with the MTSO. For example, when a mobile unit 40 wishes to place a call, it indicates this by transmitting on one or more control signal channels. These control signals may be in band or out of band signals present in one or more of the channel signals output by the channelizer 14 or input to the combiner 24. Alternatively, a separate control signal transceiver 35 may be used to receive and transmit such control signaling.

In either event, the control signals are forwarded to the base station controller 30 which requests the MTSO (not shown) to set up the end to end connection. Upon receiving an indication from the MTSO that the connection can be made at the remote end, the base station 10 then performs a number of steps, to insure that the appropriate data path through the parallel TDM bus 16 is enabled by setting up the synchronization clock generator 32.

The basestation 10 also ensures that DSPs 18 are allocated to support the connection between the newly enabled mobile 40 and the MTSO. As mentioned previously, the present invention lies in the details of how control messages are passed using the communication mechanism 20 to support these connections.

Figure 2:
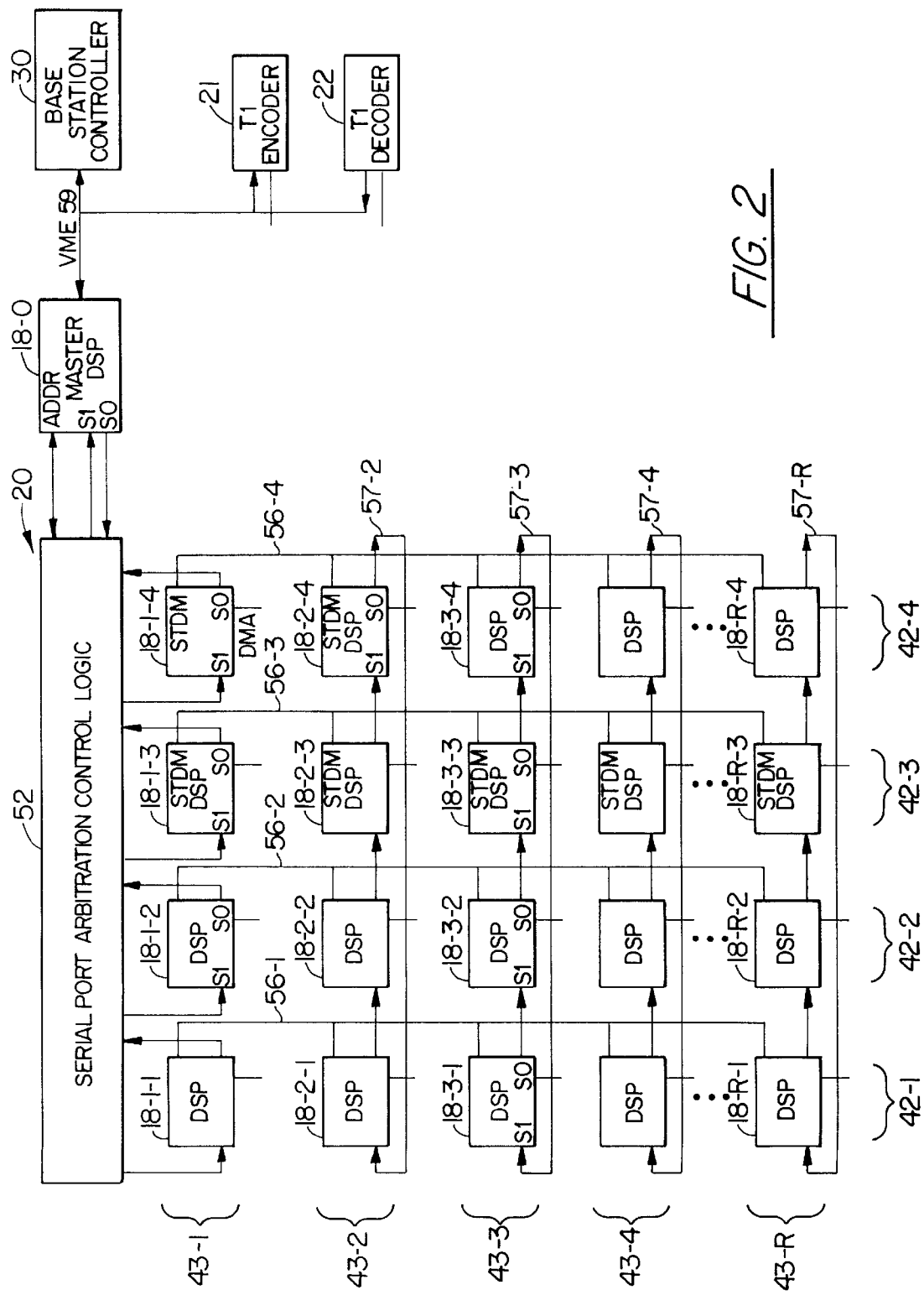

As shown in FIG. 2, the control mechanism 20 includes a master DSP 18-0, a serial port arbitration logic circuit 52, and a VME bus 59. The group of DSPs are arranged such that the individual DSPs 18 are connected in a two dimensional, row and column array. The array includes a number of columns, C, (with C=4 as shown). The DSPs in a first column 42-1, for example, include DSPs 18-1-1, 18-2-2, ..., 18-R-1. The DSP array also has a number, R, of rows each having a number of DSPs equal to the number of columns. In the example shown there are four DSPs in each row, so the second row 43-2 includes DSPs 18-2-1, 18-2-2, 18-2-3, and 18-2-4.

An exemplary DSP 18 has several different interfaces and all of the details, such as the detail of how data samples are routed to the DSPs in real time via the parallel bus 16 (FIG. 1) are not shown here, that detail being fully described in the aforementioned co-pending patent application.

Of concern here is the primary vehicle for routing control information between the master DSP 18-0 and the rest of the DSPs 18 in the array, namely the serial TDM buses 56-1, 56-2, 56-3, and 56-4, and serial loops 57-2, 57-3, ..., 57-R. A given serial TDM bus 56 interconnects the DSPs 18 that are located in a particular column 42. For example, the serial TDM bus 56-2 interconnects the STDM connections of DSPs 18-1-2, 18-2-2, ..., 18-R-2, to provide a "column" or "vertical" interconnection.

The serial TDM buses 56 are bit-serial, synchronous, time division multiplex buses such that each of the DSPs in a column is assigned a pre-determined time, in rotation, in which to transmit and receive information. Each of the serial TDM buses 56 may be full duplex, or a pair of half duplex buses may be used for each bus 56. The serial TDM bus 56 provides a mechanism whereby the maximum latency between the time of issuance of a message by the master DSP 18-0 and its ultimate receipt by one of the intended array DSPs 18-1-1, ..., 18-R-4, can be known and controlled without having to allocate all time slots for all of the DSPs in the array on a bus or without having to suffer the uncertainties of an asynchronous connection, or to other global recourse arbitration scheme which might adversely affect the ability of the array DSPs 18 to process the samples of the channel signals 15 in real time.

In a given row 42-1, the top of column DSP 18-1-1, 18-1-2, 18-1-3 or 18-1-4 (collectively, top of column DSPs 18-1) may typically be dedicated to routing messages for the DSPs in its associated column 42.

In operation, when the base station controller 30 determines that a new call needs to be set up such as by receiving a message from the narrowband transceiver 35 (FIG. 1), it sends a message along the VME bus 59 to the master DSP 18-0 indicating that one or more DSPs 18 in the array 41 needs to be assigned to the new call.

Upon receipt of that message the master DSP 18-0 determines which of the DSPs in the array 41 are available and then identifies its location by column and row number. If the call will require more than one DSP, then the appropriate number of free DSPs preferably in the same row 43 are identified. The master DSP 18-0 then composes a control message for the destination DSP(s) 18 and sends it out on its serial output (SO).

The control message is then sent to the intended recipient DSP(s), such as DSP 18-3-3, by having the master DSP 18-0 assert an address on an ADDR bus output and asserting the message over the serial output (SO) to the arbitration logic 52. The arbitration logic 52 decodes the address information and causes the message to be sent to the serial input (SI) of the appropriate top of column DSP 18-1. In the example being discussed, the message arrives at the top of column DSP 18-1-3.

The top of column DSP 18-1-3 addressed thereby then further decodes the received message to determine which of the row DSPs 18-2-3, 18-3-3, ..., 18-R-3 that it controls is the intended recipient. The message is then sent out on the serial TDM bus 56-3 by asserting the STDM output in the time slot assigned to DSP 18-3-3, and is received by the intended destination DSP 18-3-3 at its STDM input.

When a given DSP must send a message through the base station controller 30, the process is reversed. For example, the DSP 18-3-3 may assert a message on its serial TDM bus 56-3 in its assigned time slot to send the message to the top of column DSP 18-1-3. The top of column DSP 18-1-3 then forwards the message through the control logic 52 to the master DSP 18-0, which in turn passes it through the VME bus 59 to the base station controller 30.

As shows in FIG. 2, a secondary inter-DSP communication mechanism is provided in each non-top of column row 43-2, 43-3, ..., 43-R through a bit serial loop interconnection 57-2, 57-3, ... 57-R. An exemplary serial loop 57-3 connection, such as for row 43-3, is implemented by connecting the serial output (SO) of DSP 18-3-1 to the serial input (SI) of DSP 18-3-2 which in turn has its serial output (SO) connected to the serial input (SI) of the next adjacent DSP 18-3-3, and so on, in its adjacent row. The serial output (SO) of the last DSP 18-3-4 in the row 43-3 may be connected back to the serial input (SI) of the first DSP 18-3-1 in the first row 43-3. This secondary "row" or "horizontal" serial loop 57 communication mechanism permits a way for DSPs 18 which must frequently pass control messages between one another, such as DSPs 18 assigned to handle the same telephone call, to be able to do so without interrupting the more heavily used and time critical connectivity provided by the serial TDM buses 56, and without requiring such messages to be handled by the master DSP 18-0.

So, for example, if the previously mentioned control message received by DSP 18-3-3 must also be sent to a second DSP 18-3-4 which also is to be involved in handling the new call, the message is forwarded over the serial loop 57-3.

It can now be appreciated that there are several advantages to this arrangement. In particular, control information may be routed efficiently to DSP processors which are sharing tasks divided into real time processes. Minimum latency is provided for message passing between a master control process and the DSPs in the array through the vehicle of the serial TDM buses 56 which guarantee delivery of messages at a high rate among DSPs in a given column 42. In addition, the serial loop 57s provides a way for multiple DSPs 18 to be assigned to a particular task such as handling a given telephone call without adversely impacting the real time requirements of the primary control vehicle in the form of the TDM bus 56.

Furthermore, by providing a mechanism whereby individual DSPs 18 are not pre-assigned to particular radio channels, but rather may be assigned as needed by the master DSP 18-0, latent defect and fault tolerance features may be provided by the system.

What is claimed is:

1. A base station for processing signals in a multiple mobile subscriber unit wireless communication system comprising:

an antenna for receiving signals from a plurality of the mobile units as a composite radio frequency, RF, signal;

wideband digital tuner means, connected to the antenna, for downconverting a selected bandwidth of the RF signal to an intermediate frequency, IF, and for performing an analog to digital conversion on the IF signal, to provide a wideband digital tuner output signal;

digital channelization means, being connected to receive the wideband tuner output signal, and providing multiple digital channel signal outputs, each digital channel signal output having a predetermined channel bandwidth, and each digital channel signal corresponding to one of the signals received from one of the mobile units;

a plurality of digital signal processing means, for providing digitally processed channel signal outputs;

data switching means, disposed between the multiple digital channel signal outputs and the plurality of digital signal processing means, the data switching means for interconnecting any one of the multiple digital channel signal outputs to any one of the plurality of digital signal processing means; and control message routing means, connected to each of the plurality of digital signal processing means, the control message routing means for routing control messages among the plurality of digital signal processing means, the control message routing means including:

(i) master digital signal processing means for generating control messages;

(ii) a plurality, C, of primary message communication means, each including a plurality, R, of primary input/output interfaces, each such input/output interface associated with one of a number, R, of digital signal processing means arranged in a column;

(iii) control logic means, disposed between the master digital signal processing means and the plurality of primary message communication means, for routing the control messages to one of the plurality, C, of primary message communication means connected thereto; and (iv) a plurality of secondary message communication means, each associated with a number, C, of digital signal processing means arranged in a row, for communicating control messages between digital signal processing means located in the row.

2. A cellular communication system as in claim 1 wherein at least one of the primary message communication means is a bit-serial time division multiplex bus connected to a number, R, of digital signal processing means arranged in one of the columns.

3. A communication system as in claim 2 wherein one of the digital signal processing means arranged in each column is designated as a top of column digital signal processing that is responsible for routing control messages along the primary message communication means.

4. A system as in claim 1 wherein at least one of the secondary message communication means is a bit-serial loop for connecting the digital signal processing means arranged in one of the rows.

5. A system as in claim 1 where, with the exception of the master digital signal processing means, the plurality of digital signal processing means do not have a predetermined assignment for handling particular digital channel signals and the master digital signal processing means determines such assignments.

6. An apparatus for processing digital signals comprising:

a plurality of digital signal processing means, for providing digitally processed signal outputs;

control message routing means, connected to each of the plurality of digital signal processing means, the control message routing means for routing control messages among the plurality of digital signal processing means, the control message routing means including:

(i) master digital signal processing means for generating control messages;

(ii) a plurality, C, of primary message communication means, each associated with one of a number, R, of the digital signal processing means arranged in a column;

(iii) control logic means, disposed between the master digital signal processing means and the plurality of primary message communication means, for routing the control messages to one of the plurality, C, of primary message communication means connected thereto; and (iv) a plurality of secondary message communication means, each associated with a number, C, of digital signal processing means arranged in a row, for communicating control messages between digital signal processing means located in the row.

7. An apparatus as in claim 6 wherein at least one of the primary message communication means is a bit-serial time division multiplex bus connected to a number, R, of digital signal processing means arranged in one of the columns.

8. An apparatus as in claim 7 wherein one of the digital signal processing means arranged in each column is designated as a top of column digital signal processing that is responsible for routing control messages along the primary message communication means.

9. An apparatus as in claim 6 wherein at least one of the secondary message communication means is a bit-serial loop for connecting the digital signal processing means arranged in one of the rows.

10. An apparatus as in claim 6 where, with the exception of the master digital signal processing means, the plurality of digital signal processing means do not have a predetermined assignment for handling particular digital channel signals and the master digital signal processing means determines such assignments.

* * * * *